(12) United States Patent
Liu et al.

(10) Patent No.: US 11,465,890 B2
(45) Date of Patent: Oct. 11, 2022

(54) HUB LIFTING AND PICK-AND-PLACE EQUIPMENT

(71) Applicant: CITIC Dicastal CO., LTD., Hebei (CN)

(72) Inventors: Hailong Liu, Qinhuangdao (CN); Haipeng Feng, Qinhuangdao (CN); Naili Li, Qinhuangdao (CN); Zhi Chen, Qinhuangdao (CN); Tianyi Deng, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 508 days.

(21) Appl. No.: 16/693,849

(22) Filed: Nov. 25, 2019

(65) Prior Publication Data
US 2020/0298429 A1 Sep. 24, 2020

(30) Foreign Application Priority Data
Mar. 22, 2019 (CN) .......................... 201910220736.2

(51) Int. Cl.
| | | |
|---|---|---|
| *B66D 1/60* | (2006.01) | |
| *B60B 29/00* | (2006.01) | |
| *B60B 27/00* | (2006.01) | |
| *B65G 47/90* | (2006.01) | |
| *B65G 47/22* | (2006.01) | |
| *B25J 19/02* | (2006.01) | |
| *B62D 65/12* | (2006.01) | |

(52) U.S. Cl.
CPC ................ *B66D 1/60* (2013.01); *B60B 27/00* (2013.01); *B60B 29/001* (2013.01); *B65G 47/22* (2013.01); *B65G 47/905* (2013.01); *B25J 19/023* (2013.01); *B62D 65/12* (2013.01)

(58) Field of Classification Search
CPC ............ B60B 27/00; B65G 1/026; B66D 1/60
See application file for complete search history.

(56) References Cited

U.S. PATENT DOCUMENTS

| | | | | |
|---|---|---|---|---|
| 4,942,659 A | * | 7/1990 | Sakurai .................. | B23P 19/10 29/714 |
| 2009/0224221 A1 | * | 9/2009 | Monroe .................. | B66C 5/02 254/4 R |
| 2020/0317478 A1 | * | 10/2020 | Shin ........................ | B66D 1/54 |

* cited by examiner

*Primary Examiner* — Thomas Randazzo
(74) *Attorney, Agent, or Firm* — Cooper Legal Group, LLC (57) ABSTRACT

Hub lifting and pick-and-place equipment includes a fixed plate. The lower portion of the fixed plate is connected with a vertical plate. One side of the bottom of the vertical plate is fixedly connected with a fixed frame. The bottom of the vertical plate is hinged with a safety plate. The safety plate and the vertical plate are also connected with each other through shielding oil cylinders. A wire holder is mounted on one side of the vertical plate.

12 Claims, 9 Drawing Sheets

HUB LIFTING AND PICK-AND-PLACE EQUIPMENT

CROSS-REFERENCE TO RELATED APPLICATIONS

The present application claims benefit of Chinese Patent Application No. 201910220736.2, filed on Mar. 22, 2019, the contents of which are hereby incorporated by reference in its entirety.

BACKGROUND

With the continuous development of the automobile industry, all kinds of automobiles have entered the daily life of people. As an important means of transportation, automobiles have brought great convenience to travel and tourism of people. As an important part of an automobile, a hub will be refitted frequently in automobile assembling and refitting processes. During the replacement or assembly of hubs, the hubs placed in an assembly workshop are generally located at the corner or wall of the workshop, and there is a dedicated hub mounting frame for collecting the hubs, but the hubs need to be picked and placed manually by operators under the help of a jack or lifting equipment. The operation process is laborious and cumbersome, and a hub placement device would take up a space on the floor of the workshop, causing crowding in the workshop. Novel hub pick-and-place equipment is now needed to solve the above problem.

SUMMARY

The present disclosure relates to the field of vehicle repairing equipment, and more particularly relates to hub lifting and pick-and-place equipment.

The present disclosure is directed to provide hub lifting and pick-and-place equipment, so as to solve the problems mentioned in the background art.

In order to achieve the above objective, the present disclosure provides the following technical solution. Hub lifting and pick-and-place equipment includes a fixed plate. The lower portion of the fixed plate is connected with a vertical plate. The edge position of the fixed plate cooperates with connection feet through a plurality of main bolts. One end of the fixed plate is provided with a camera frame. A plurality of cameras are mounted on the camera frame. A plurality of rows of push oil cylinders are arranged on the vertical plate. Piston rods of the push oil cylinders penetrate through the vertical plate and are fixedly connected with translational plate racks. A plurality of speed reduction motors are arranged at the upper sides of the front portions of the translational plate racks. Output shafts of the speed reduction motors cooperate with reels. Slings are wound on the reels. The end portions of the slings are connected with lifting hooks. Corresponding positions, located below the speed reduction motors, of the translational plate racks are connected with anti-collision plates through elastic components. A fixed frame is arranged on one side of the bottom of the vertical plate, and is connected with a plurality of speed reduction motors and anti-collision plates. The bottom of the vertical plate is hinged with a safety plate. The safety plate and the vertical plate are also connected with each other through shielding oil cylinders. A wire holder is mounted on one side of the vertical plate, and is connected with an operation table through a wire.

In an embodiment, the cameras may include a first camera and a second camera. The first camera, the second camera, the push oil cylinders, the speed reduction motors and the shielding oil cylinders are all electrically connected with the wire holder.

In an embodiment, a plurality of connection bolts may penetrate through each connection foot. The connection feet are fixedly connected with a ceiling of a workshop through the connection bolts. A plurality of reinforcing ribs are welded between the fixed plate and the vertical plate.

In an embodiment, the bottom of the vertical plate may be welded with extending legs. The extending legs are hinged with the safety plate. The vertical plate is also welded with hinge seats. One ends of the shielding oil cylinders are hinged with the hinge seats. The end portions of piston rods of the shielding oil cylinders are hinged with connection slots formed in the safety plate.

In an embodiment, the lifting hooks and the anti-collision plates may be covered with rubber layers. The mounting manner of the speed reduction motors and the anti-collision plates on the fixed frame is the same as the mounting manner of the speed reduction motors and the anti-collision plates on the translational plate racks.

In an embodiment, the front ends of the reels may be provided with protruding shafts. The protruding shafts are hinged with hangtags through bearings. Mark numbers are sprayed onto the hangtags. The two sides of the fixed frame are provided with steps, and the fixed frame is fixedly connected with the vertical plate through the steps.

In an embodiment, a monitor screen well-matched with the cameras may be arranged at the upper portion of the operation table. A main switch, a shielding switch, a plurality of push switches and a plurality of lifting switches are arranged at the lower portion of the operation table. The main switch controls a circuit to be switched on and switched off. The shielding switch is an external switch of the shielding oil cylinders. The push switches are external switches of the push oil cylinders. The lifting switches are external switches of the speed reduction motors.

Compared with the prior art, the present disclosure has the beneficial effects as follows. When the hub lifting and pick-and-place equipment is used, the plurality of main bolts penetrate through the edge position of the fixed plate and are screwed with the connection feet, and the connection feet are fixedly connected with the ceiling of the workshop through the connection bolts. Such a design allows the fixed plate to be fixedly connected with the ceiling of the workshop. Since there are many reliable acting points, the fixed plate is difficult to fall off. This mode is safer than a mode of directly fixing the fixed plate to the ceiling through the main bolts. The vertical plate is welded with the fixed plate, and the reinforcing ribs play a role of enhancing the connection strength between the vertical plate and the fixed plate. The push oil cylinders are in different rows and fixedly connected to the vertical plate. It is appropriate to set 2 to 3 push oil cylinders in each row, which are disposed at the same height. The piston rods of the push oil cylinders are fixedly connected with the translational plate racks. The speed reduction motors cooperate with the reels. The lifting hooks and the anti-collision plates are covered with the rubber layers which play a role of skid resistance and shock absorption. During lifting of hubs, an operator operates the operation table set on the ground. After the main switch is pressed, the wire holder is powered on. The shielding switch is used for controlling the shielding oil cylinders. The safety plate is located at a horizontal position at first, and may shield the lifting hooks. A user controls the shielding oil cylinders to retract through the shielding switch, and then the safety plate would be laid down. At this time, the safety plate no longer shields the lifting hooks, and the operator may see the vertical plate when looking up. The first camera and the second camera are used for capturing image information of the vertical plate, and the monitor screen is used for displaying captured pictures, so that the operator may know the number and types of hubs hung on the vertical plate fast and accurately. The hangtags at the end portions of the reels rotatably cooperate with the protruding shafts through the bearings. Since the top ends of the hangtags cooperate with the protruding shafts, under the effect of gravity, the hangtags may hang down all the time in the rotating process of the reels because of light top and heavy bottom. The mark numbers are used for marking the types of the hubs. The hubs of the fixed types are hung on the lifting hooks having the corresponding mark numbers. The fixed frame is located at the bottommost side of the vertical plate, and may not extend out. When the hubs hung on the lifting hooks on the fixed frame need to be put down, the corresponding lifting switches are directly operated. The translational plate racks are all located above the fixed frame. In the lifting work for the hubs hung on the translational plate racks, firstly, the push oil cylinders are operated. The push oil cylinders in the same row are synchronously operated by the same push switch. After the translational plate racks are pushed out, they are located in front of the fixed frame. At this time, the speed reduction motors on the extending translational plate racks are controlled to put down the hubs hung on the reels corresponding to the speed reduction motors. In this way, the hubs put down may not be blocked by the hubs below. After the hubs are put down, they are taken down, or new hubs are hung. In the lifting process of the lifting hooks, since the slings slightly swing, the lifting hooks may also swing. In case of a large swing degree, the anti-collision plates may achieve a blocking effect to prevent the lifted hubs from colliding with the translational plate racks or the fixed frame. The anti-collision plates have the shock absorption effect due to their cooperation with the elastic components, so as to effectively buffer the swing impact of the hubs. The rubber layers play a role of preventing colliding damage to the hubs. After the hubs are lifted to a regulated height range, the translational plate racks are pulled back through the push oil cylinders. After the lifting work is finished, the piston rods of the shielding oil cylinders are controlled by the shielding switch to extend out, and then the safety plate returns to the horizontal position again to shield the corresponding positions below the hubs, and people below may not see the hubs hung on the vertical plate. In this way, the phenomenon that workshop personnel passing the position below the vertical plate may feel scared may be avoided. Meanwhile, if a hub really falls off, the hub will fall onto the safety plate at first, and the safety plate may catch the falling hub. Even if the falling hub is not caught, it strikes the safety plate when falling and generates a strike note that may also remind the operator passing by. Therefore, as the hub continues to roll down from the safety plate, it leaves time for the operator passing by to escape, so as to avoid the phenomenon that the operator is injured by the directly fallen hub. This device does not occupy the space on the floor, is high in safety and convenient to operate, can be applied to pick-and-place work of various types of hubs, and is favorable for reasonable use of the space on the floor of the assembly workshop. Furthermore, the operation process is labor saving and fast, so that the physical output of the operator is reduced.

In the drawings: 1: fixed plate; 2: vertical plate; 3: main bolt; 4: connection foot; 5: camera frame; 6: push oil cylinder; 7: translational plate rack; 8: speed reduction motor; 9: reel; 10: sling; 11: lifting hook; 12: elastic component; 13: anti-collision plate; 14: fixed frame; 15: safety plate; 16: shielding oil cylinder; 17: wire holder; 18: wire; 19: operation table; 20: connection bolt; 21: reinforcing rib; 22: first camera; 23: second camera; 24: extending leg; 25: hinge seat; 26: connection slot; 27: rubber layer; 28: protruding shaft; 29: bearing; 30: hangtag; 31: mark number; 32: step; 33: monitor screen; 34: main switch; 35: shielding switch; 36: push switch; 37: lifting switch; and 38: hub.

DETAILED DESCRIPTION

Technical solutions of the present disclosure will be described clearly and completely below in combination with the drawings in the embodiments of the present disclosure. Obviously, the embodiments described herein are only part of the embodiments of the present disclosure, not all the embodiments. Based on the embodiments in the present disclosure, all other embodiments obtained by those ordinarily skilled in the art without doing creative work shall fall within the protection scope of the present disclosure.

Figure 1:
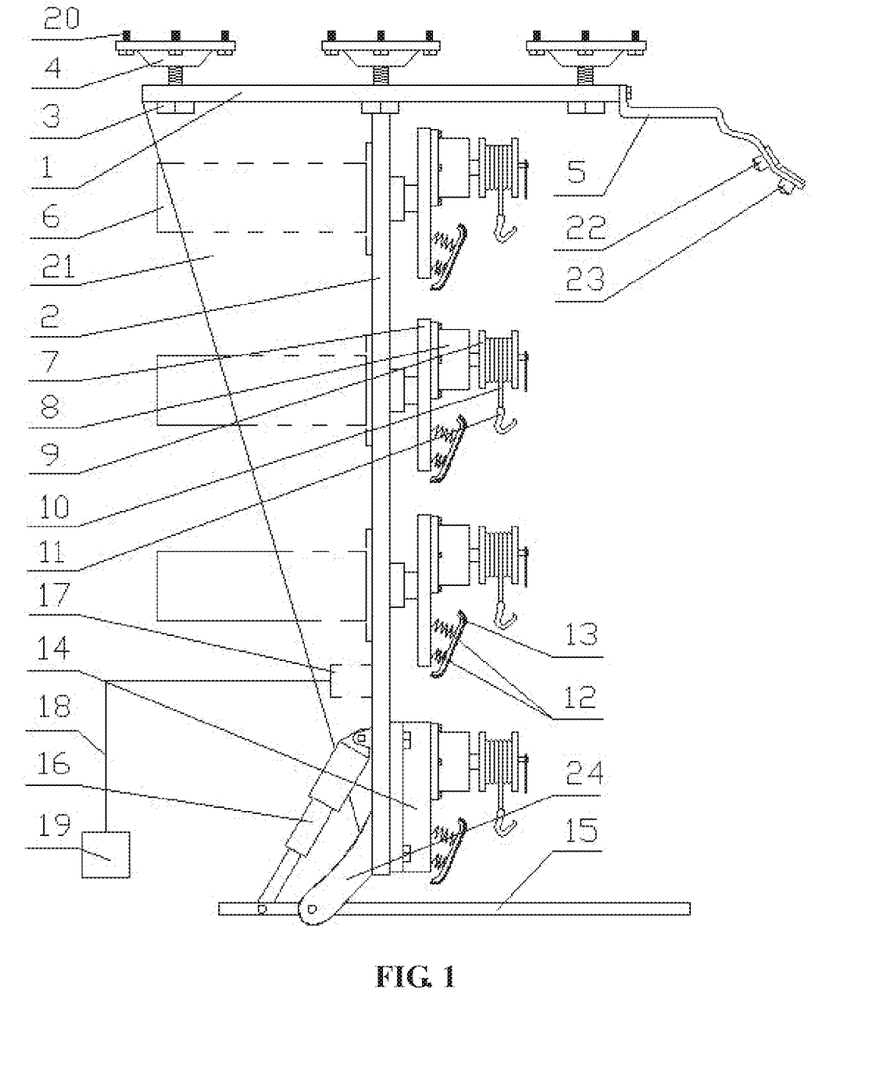
FIG. 1 is a schematic structural diagram of the present disclosure.
Figure 2:
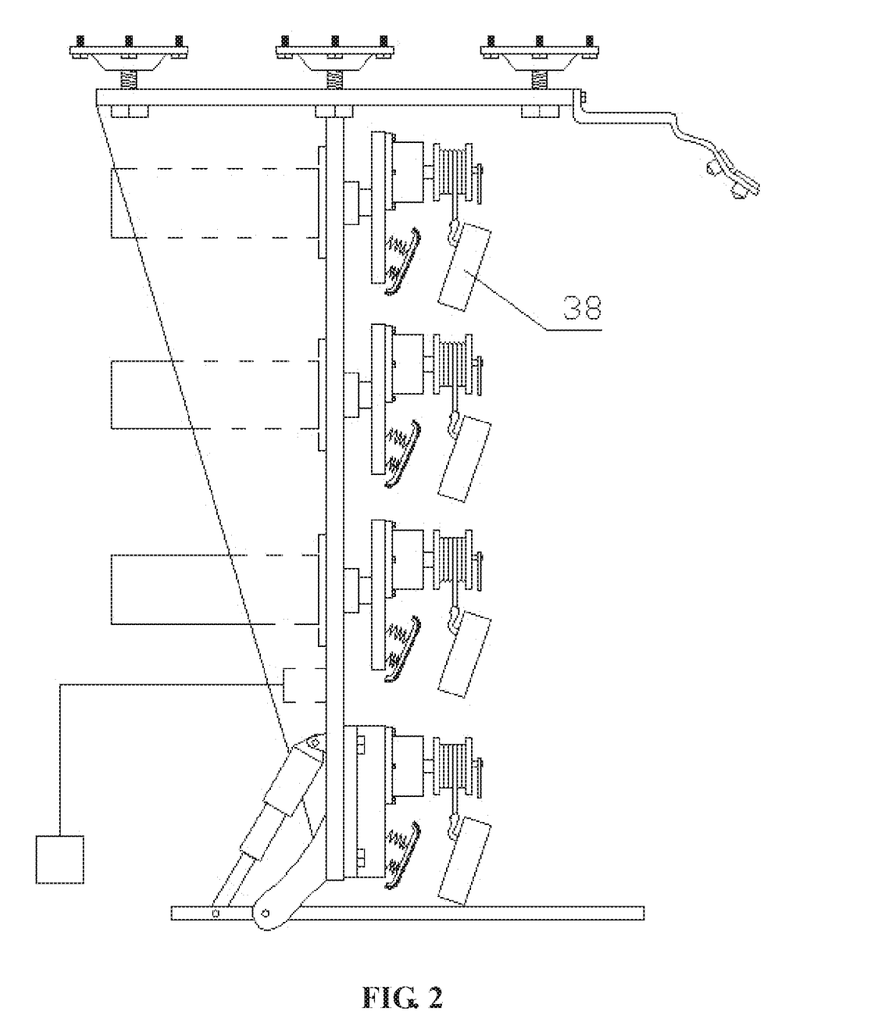
FIG. 2 is a schematic structural diagram of FIG. 1 after hubs are hung.
Figure 3:
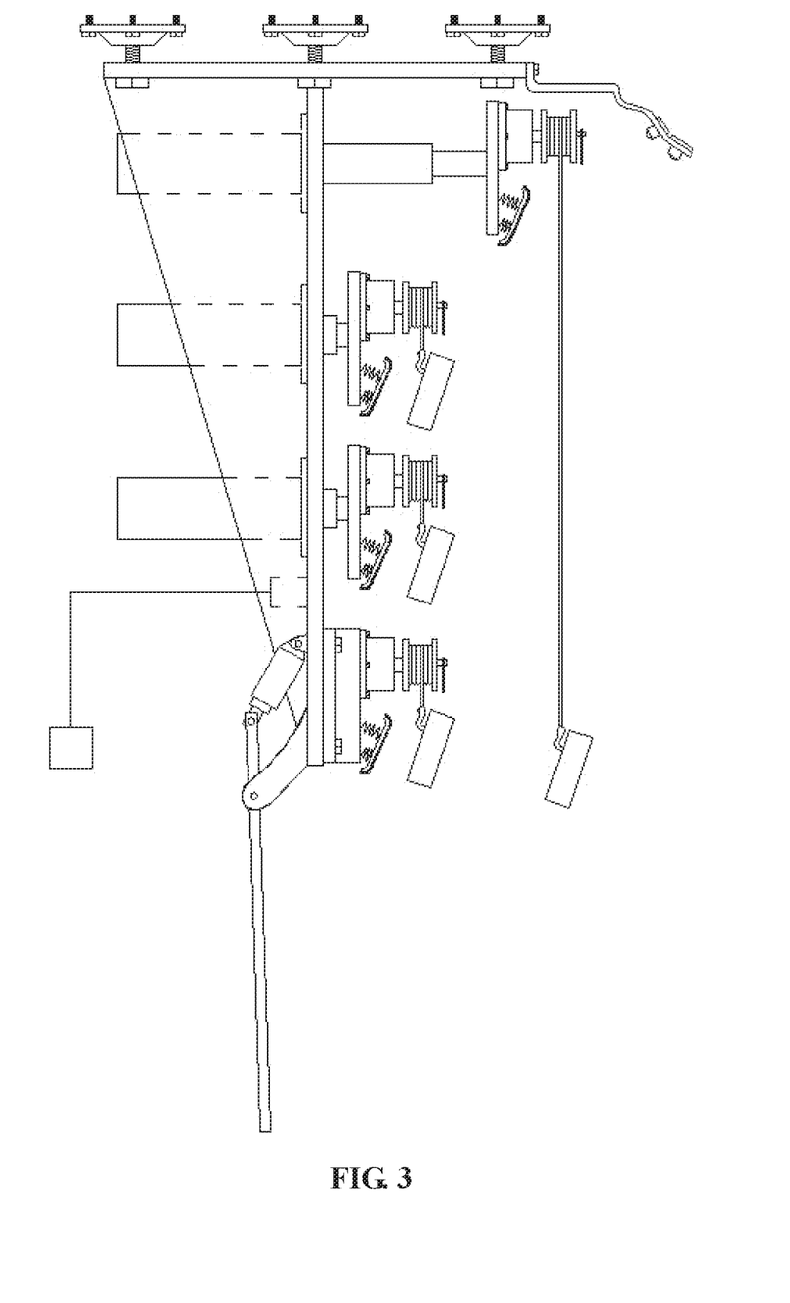
FIG. 3 is a schematic structural diagram of FIG. 2 after a safety plate is laid down and one hub is put down.
Figure 4:
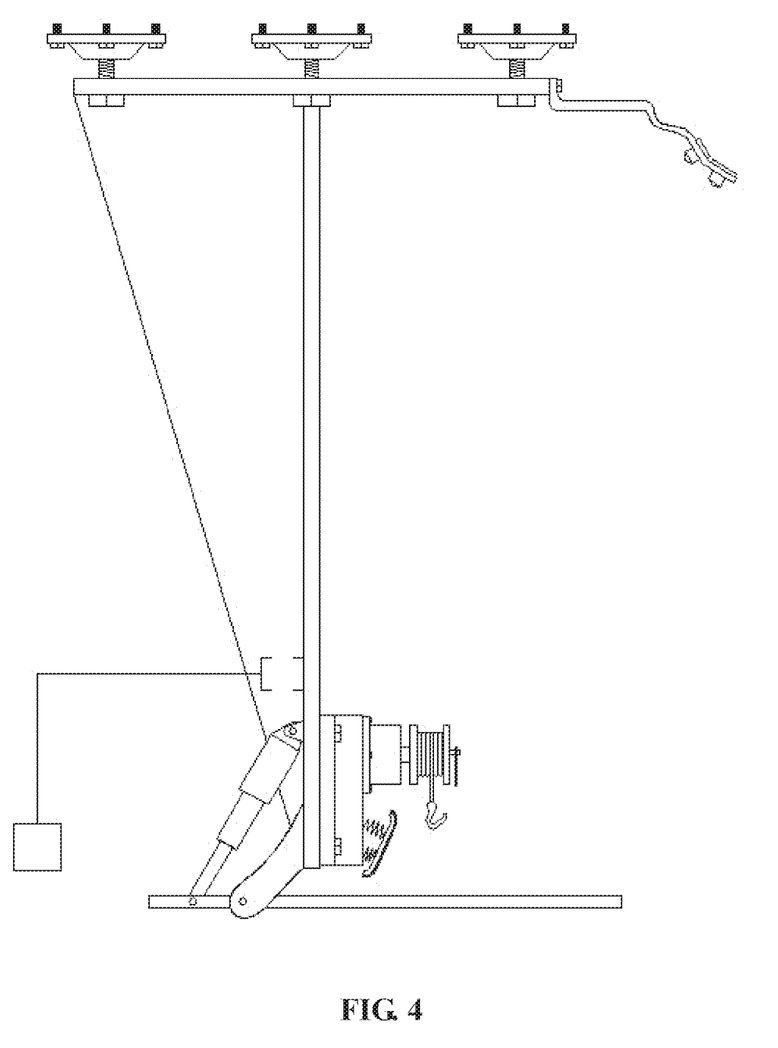
FIG. 4 is a schematic structural diagram of FIG. 1 after push oil cylinders are removed.
Figure 5:
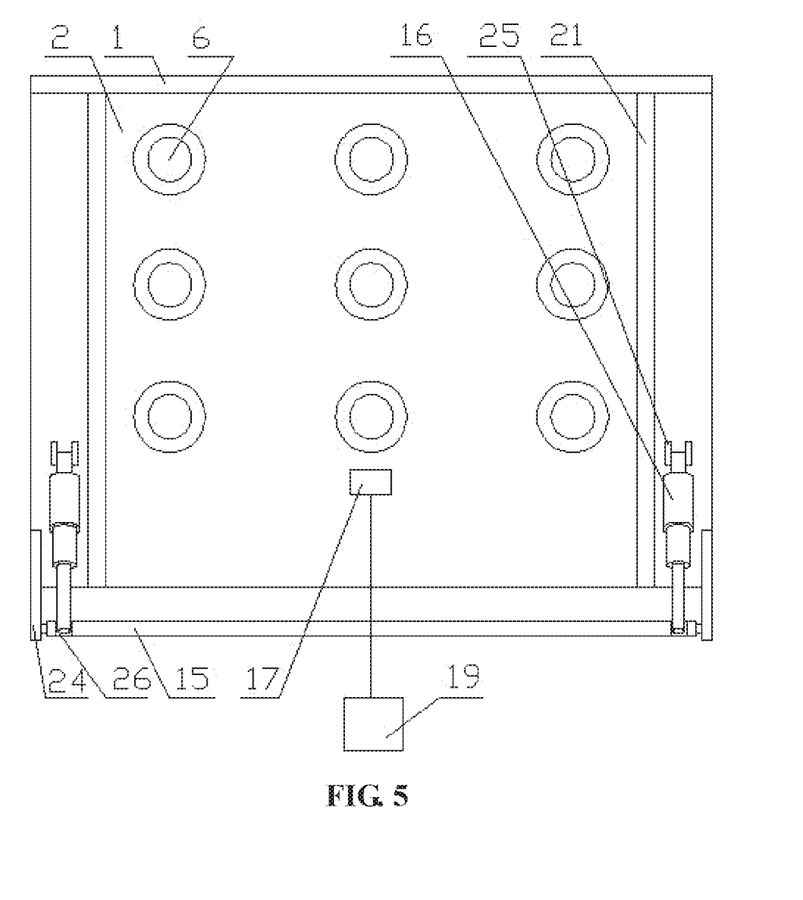
FIG. 5 is a left view of FIG. 1.
Figure 6:
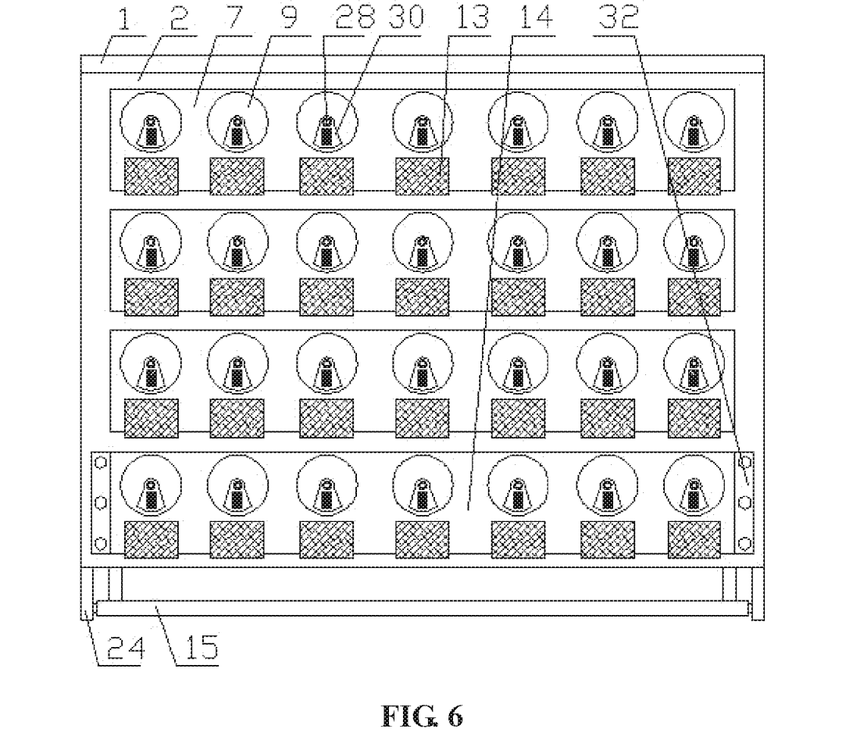
FIG. 6 is a right view of FIG. 1 after a camera frame is removed.
Figure 7:
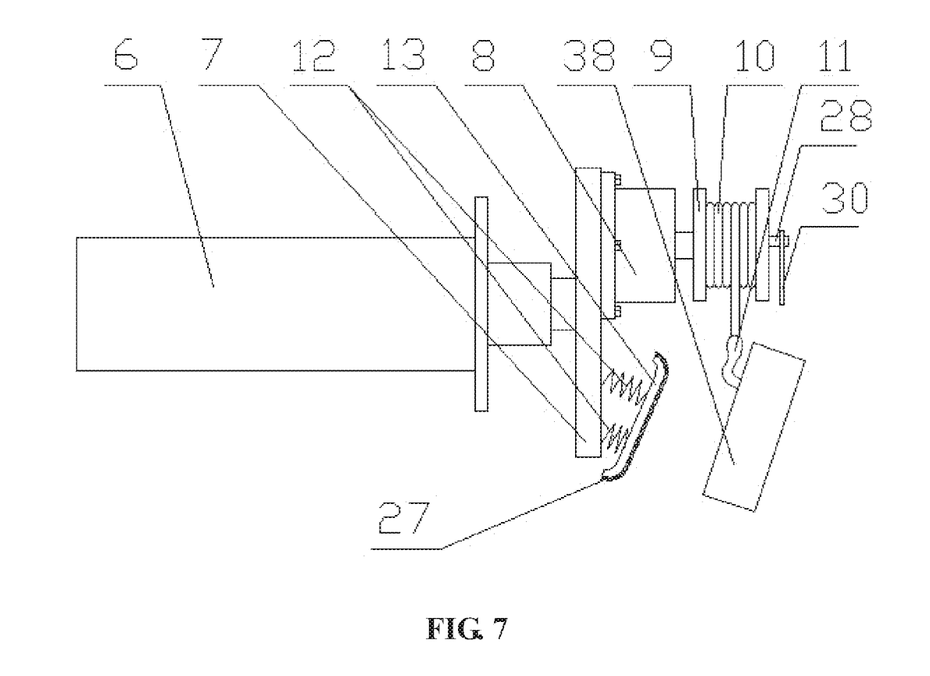
FIG. 7 is a schematic structural diagram of cooperation of a push oil cylinder, a translational plate rack, a speed reduction motor, a reel and an anti-collision plate.
Figure 8:
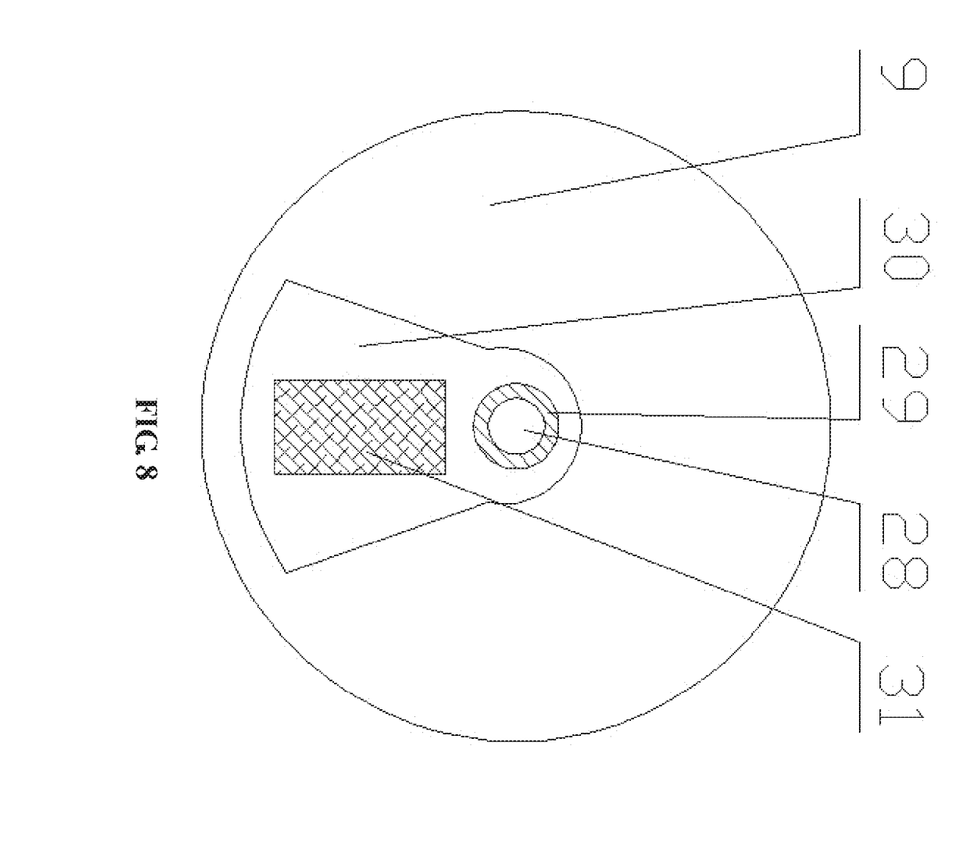
FIG. 8 is a right view of the reel in FIG. 7.
Figure 9:
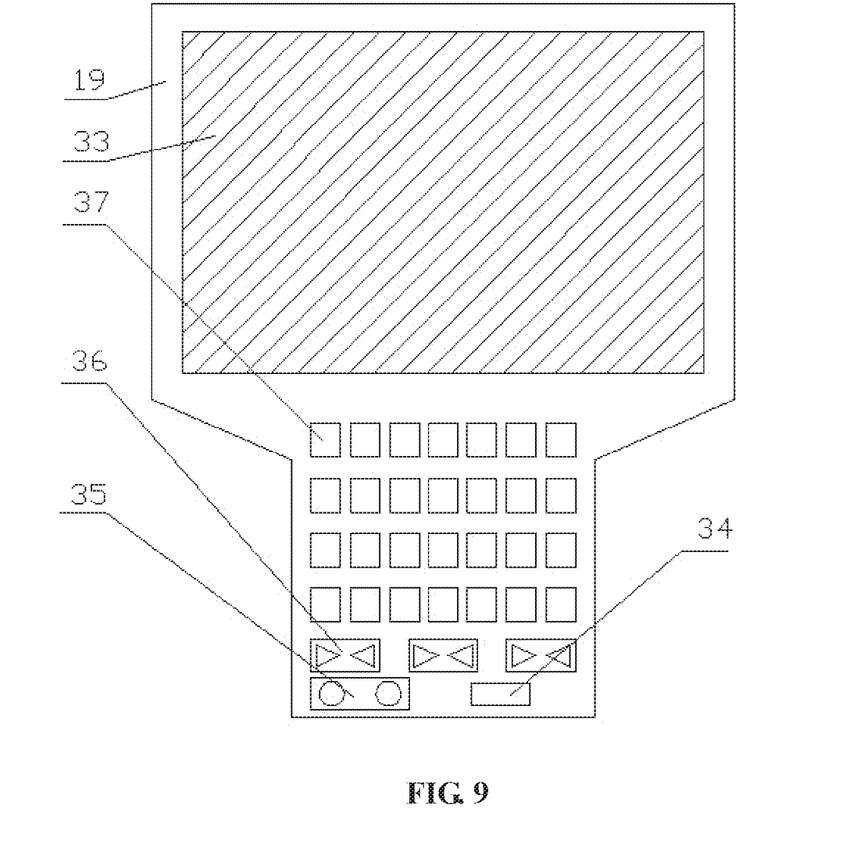
FIG. 9 is a schematic structural diagram of an operation table of the present disclosure.

Referring to FIGS. 1 to 9, the present disclosure provides a technical solution: hub lifting and pick-and-place equipment includes a fixed plate 1. The lower portion of the fixed plate 1 is connected with a vertical plate 2. The edge position of the fixed plate 1 cooperates with connection feet 4 through a plurality of main bolts 3. One end of the fixed plate 1 is provided with a camera frame 5. A plurality of cameras are mounted on the camera frame 5. A plurality of rows of push oil cylinders 6 are arranged on the vertical plate 2. Piston rods of the push oil cylinders 6 penetrate through the vertical plate 2 and are fixedly connected with translational plate racks 7. A plurality of speed reduction motors 8 are arranged at the upper sides of the front portions of the translational plate racks 7. Output shafts of the speed reduction motors 8 cooperate with reels 9. Slings 10 are wound on the reels 9. The end portions of the slings 10 are connected with lifting hooks 11. Corresponding positions, located below the speed reduction motors 8, of the translational plate racks 7 are connected with anti-collision plates 13 through elastic components 12. A fixed frame 14 is arranged on one side of the bottom of the vertical plate 2, and is connected with a plurality of speed reduction motors 8 and anti-collision plates 13. The bottom of the vertical plate 2 is hinged with a safety plate 15. The safety plate 15 and the vertical plate 2 are also connected with each other through shielding oil cylinders 16. A wire holder 17 is mounted on one side of the vertical plate 2, and is connected with an operation table 19 through a wire 18. The cameras include a first camera 22 and a second camera 23. The first camera 22, the second camera 23, the push oil cylinders 6, the speed reduction motors 8 and the shielding oil cylinders 16 are all electrically connected with the wire holder 17. A plurality of connection bolts 20 penetrate through each connection foot 4. The connection feet 4 are fixedly connected with a ceiling of a workshop through the connection bolts 20. A plurality of reinforcing ribs 21 are welded between the fixed plate 1 and the vertical plate 2. The bottom of the vertical plate 2 is welded with extending legs 24. The extending legs 24 are hinged with the safety plate 15. The vertical plate 2 is also welded with hinge seats 25. One ends of the shielding oil cylinders 16 are hinged with the hinge seats 25. The end portions of piston rods of the shielding oil cylinders 16 are hinged with connection slots 26 formed in the safety plate 15. The lifting hooks 11 and the anti-collision plates 13 are covered with rubber layers 27. The mounting manner of the speed reduction motors and the anti-collision plates on the fixed frame 14 is the same as the mounting manner of the speed reduction motors and the anti-collision plates on the translational plate racks 7. The front ends of the reels 9 are provided with protruding shafts 28. The protruding shafts 28 are hinged with hangtags 30 through bearings 29. Mark numbers 31 are sprayed onto the hangtags 30. The two sides of the fixed frame 14 are provided with steps 32, and the fixed frame 14 is fixedly connected with the vertical plate 2 through the steps 32. A monitor screen 33 well-matched with the cameras is arranged at the upper portion of the operation table 19. A main switch 34, a shielding switch 35, a plurality of push switches 36 and a plurality of lifting switches 36 are arranged at the lower portion of the operation table 19. The main switch 34 controls a circuit to be switched on and switched off. The shielding switch 35 is an external switch of the shielding oil cylinders 16. The push switches 36 are external switches of the push oil cylinders 16. The lifting switches 37 are external switches of the speed reduction motors 8.

A working principle is as follows. When the hub lifting and pick-and-place equipment is used, the plurality of main bolts 3 penetrate through the edge position of the fixed plate 1 and are screwed with the connection feet 4, and the connection feet 4 are fixedly connected with the ceiling of the workshop through the connection bolts 20. Such a design allows the fixed plate 1 to be fixedly connected with the ceiling of the workshop. Since there are many reliable acting points, the fixed plate 1 is difficult to fall off. This mode is safer than a mode of directly fixing the fixed plate 1 to the ceiling through the main bolts 3. The vertical plate 2 is welded with the fixed plate 1, and the reinforcing ribs 21 play a role of enhancing the connection strength between the vertical plate 2 and the fixed plate 1. The push oil cylinders 6 are in different rows and fixedly connected to the vertical plate 2. It is appropriate to set 2 to 3 push oil cylinders 6 in each row, which are disposed at the same height. The piston rods of the push oil cylinders 6 are fixedly connected with the translational plate racks 7. The speed reduction motors 8 cooperate with the reels 9. The lifting hooks 11 and the anti-collision plates 13 are covered with the rubber layers 27 which play a role of skid resistance and shock absorption. During lifting of hubs 38, an operator operates the operation table 19 set on the ground. After the main switch 34 is pressed, the wire holder 17 is powered on. The shielding switch 35 is used for controlling the shielding oil cylinders 16. The safety plate 15 is located at a horizontal position at first, and may shield the lifting hooks 11. A user controls the shielding oil cylinders 16 to retract through the shielding switch 35, and then the safety plate 15 would be laid down.

At this time, the safety plate 15 no longer shields the lifting hooks 11, and the operator may see the vertical plate 2 when looking up. The first camera 22 and the second camera 23 are used for capturing image information of the vertical plate 2, and the monitor screen 33 is used for displaying captured pictures, so that the operator may know the number and types of hubs 38 hung on the vertical plate 2 fast and accurately. The hangtags 30 at the end portions of the reels 9 rotatably cooperate with the protruding shafts 28 through the bearings 29. Since the top ends of the hangtags 30 cooperate with the protruding shafts 28, under the effect of gravity, the hangtags 30 may hang down all the time in the rotating process of the reels 9 because of light top and heavy bottom. The mark numbers 31 are used for marking the types of the hubs 38. The hubs 38 of the fixed types are hung on the lifting hooks 11 having the corresponding mark numbers 31. The fixed frame 14 is located at the bottommost side of the vertical plate 2, and may not extend out. When the hubs 38 hung on the lifting hooks 11 on the fixed frame 14 need to be put down, the corresponding lifting switches 37 are directly operated. The translational plate racks 7 are all located above the fixed frame 14. In the lifting work for the hubs 38 hung on the translational plate racks 7, firstly, the push oil cylinders 6 are operated. The push oil cylinders 6 in the same row are synchronously operated by the same push switch 36. After the translational plate racks 7 are pushed out, they are located in front of the fixed frame 14. At this time, the speed reduction motors 8 on the extending translational plate racks 7 are controlled to put down the hubs 38 hung on the reels 9 corresponding to the speed reduction motors 8. In this way, the hubs 38 put down may not be blocked by the hubs 38 below. After the hubs 38 are put down, they are taken down, or new hubs 38 are hung. In the lifting process of the lifting hooks 11, since the slings 10 slightly swing, the lifting hooks 11 may also swing. In case of a large swing degree, the anti-collision plates 13 may achieve a blocking effect to prevent the lifted hubs 38 from colliding with the translational plate racks 7 or the fixed frame 14. The anti-collision plates 13 have the shock absorption effect due to their cooperation with the elastic components 12, so as to effectively buffer the swing impact of the hubs 38. The rubber layers 27 play a role of preventing colliding damage to the hubs 38. After the hubs 38 are lifted to a regulated height range, the translational plate racks 7 are pulled back through the push oil cylinders 6. After the lifting work is finished, the piston rods of the shielding oil cylinders 16 are controlled by the shielding switch 35 to extend out, and then the safety plate 15 returns to the horizontal position again to shield the corresponding positions below the hubs 38, and people below may not see the hubs 38 hung on the vertical plate 2. In this way, the phenomenon that workshop personnel passing the position below the vertical plate 2 may feel scared may be avoided. Meanwhile, if a hub 38 really falls off, the hub 38 will fall onto the safety plate 15 at first, and the safety plate 15 may catch the falling hub 38. Even if the falling hub 38 is not caught, it strikes the safety plate 15 when falling and generates a strike note that may also remind the operator passing by. Therefore, as the hub 38 continues to roll down from the safety plate 15, it leaves time for the operator passing by to escape, so as to avoid the phenomenon that the operator is injured by the directly fallen hub.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. Hub lifting and pick-and-place equipment, comprising a fixed plate, wherein a lower portion of the fixed plate is fixedly connected with a vertical plate; connection feet are arranged on the fixed plate; one end of the fixed plate is provided with a camera frame; cameras are mounted on the camera frame; a plurality of rows of push oil cylinders are arranged on the vertical plate; piston rods of the push oil cylinders penetrate through the vertical plate and are fixedly connected with translational plate racks; a plurality of speed reduction motors are arranged at upper sides of front portions of the translational plate racks; output shafts of the speed reduction motors cooperate with reels; slings are wound on the reels; end portions of the slings are provided with lifting hooks; corresponding positions, located below the speed reduction motors, of the translational plate racks are connected with anti-collision plates through elastic components; a fixed frame is arranged on one side of a bottom of the vertical plate; a plurality of speed reduction motors and anti-collision plates are arranged on the fixed frame; the bottom of the vertical plate is hinged with a safety plate; the safety plate and the vertical plate are connected with each other through shielding oil cylinders; a wire holder is arranged on one side of the vertical plate, and is electrically connected with an operation table.

2. The hub lifting and pick-and-place equipment according to claim 1, wherein the cameras comprise a first camera and a second camera; and the first camera, the second camera, the push oil cylinders, the speed reduction motors and the shielding oil cylinders are all electrically connected with the wire holder.

3. The hub lifting and pick-and-place equipment according to claim 1, wherein the plurality of connection feet are fixedly connected with a ceiling of a workshop; and a plurality of reinforcing ribs are welded between the fixed plate and the vertical plate.

4. The hub lifting and pick-and-place equipment according to claim 1, wherein the bottom of the vertical plate is welded with extending legs; the extending legs are hinged with the safety plate; the vertical plate is further welded with hinge seats; one ends of the shielding oil cylinders are hinged with the hinge seats; and end portions of piston rods of the shielding oil cylinders are hinged with connection slots formed in the safety plate.

5. The hub lifting and pick-and-place equipment according to claim 1, wherein the lifting hooks and the anti-collision plates are covered with rubber layers; a mounting manner of the speed reduction motors and the anti-collision plates on the fixed frame is the same as a mounting manner of the speed reduction motors and the anti-collision plates on the translational plate racks.

6. The hub lifting and pick-and-place equipment according to claim 1, wherein front ends of the reels are provided with protruding shafts; the protruding shafts are hinged with hangtags through bearings; mark numbers are sprayed onto the hangtags; two sides of the fixed frame are provided with steps, and the fixed frame is fixedly connected with the vertical plate through the steps.

7. The hub lifting and pick-and-place equipment according to claim 1, wherein a monitor screen well-matched with the cameras is arranged at an upper portion of the operation table; a main switch, a shielding switch, a plurality of push switches and a plurality of lifting switches are arranged at a lower portion of the operation table; the main switch controls a circuit to be switched on and switched off; the shielding switch is an external switch of the shielding oil cylinders; the push switches are external switches of the push oil cylinders; and the lifting switches are external switches of the speed reduction motors.

8. The hub lifting and pick-and-place equipment according to claim 2, wherein a monitor screen well-matched with the cameras is arranged at an upper portion of the operation table; a main switch, a shielding switch, a plurality of push switches and a plurality of lifting switches are arranged at a lower portion of the operation table; the main switch controls a circuit to be switched on and switched off; the shielding switch is an external switch of the shielding oil cylinders; the push switches are external switches of the push oil cylinders; and the lifting switches are external switches of the speed reduction motors.

9. The hub lifting and pick-and-place equipment according to claim 3, wherein a monitor screen well-matched with the cameras is arranged at an upper portion of the operation table; a main switch, a shielding switch, a plurality of push switches and a plurality of lifting switches are arranged at a lower portion of the operation table; the main switch controls a circuit to be switched on and switched off; the shielding switch is an external switch of the shielding oil cylinders; the push switches are external switches of the push oil cylinders; and the lifting switches are external switches of the speed reduction motors.

10. The hub lifting and pick-and-place equipment according to claim 4, wherein a monitor screen well-matched with the cameras is arranged at an upper portion of the operation table; a main switch, a shielding switch, a plurality of push switches and a plurality of lifting switches are arranged at a lower portion of the operation table; the main switch controls a circuit to be switched on and switched off; the shielding switch is an external switch of the shielding oil cylinders; the push switches are external switches of the push oil cylinders; and the lifting switches are external switches of the speed reduction motors.

11. The hub lifting and pick-and-place equipment according to claim 5, wherein a monitor screen well-matched with the cameras is arranged at an upper portion of the operation table; a main switch, a shielding switch, a plurality of push switches and a plurality of lifting switches are arranged at a lower portion of the operation table; the main switch controls a circuit to be switched on and switched off; the shielding switch is an external switch of the shielding oil cylinders; the push switches are external switches of the push oil cylinders; and the lifting switches are external switches of the speed reduction motors.

12. The hub lifting and pick-and-place equipment according to claim 6, wherein a monitor screen well-matched with the cameras is arranged at an upper portion of the operation table; a main switch, a shielding switch, a plurality of push switches and a plurality of lifting switches are arranged at a lower portion of the operation table; the main switch controls a circuit to be switched on and switched off; the shielding switch is an external switch of the shielding oil cylinders; the push switches are external switches of the push oil cylinders; and the lifting switches are external switches of the speed reduction motors.

* * * * *